United States Patent

Keenan

[15] 3,671,581

[45] June 20, 1972

[54] THE PRODUCTION OF CERTAIN CARBOXYLIC ACIDS

[72] Inventor: John Francis Edmund Keenan, Cheadle Hulme, England

[73] Assignee: Ciba-Geigy Corporation, Ardsley, N.Y.

[22] Filed: April 24, 1969

[21] Appl. No.: 819,084

[52] U.S. Cl. ..................260/527 R, 260/531 C, 260/540
[51] Int. Cl. ..................C07c 51/00, C07c 51/30
[58] Field of Search ..................260/527 R, 540, 531 C

[56] References Cited

UNITED STATES PATENTS

| | | | |
|---|---|---|---|
| 1,926,059 | 9/1933 | Pelton et al. | 260/531 C |
| 1,926,068 | 9/1933 | Strosacker et al. | 260/531 C |
| 2,379,098 | 6/1945 | Nixon | 260/540 |
| 2,384,817 | 9/1945 | Chitwood | 260/531 C |
| 2,926,182 | 2/1960 | Sutton | 260/531 C |

Primary Examiner—James A. Patten
Attorney—Karl F. Jorda and Martin J. Spellman

[57] ABSTRACT

Improvements in the production of carboxylic acids of the formula R—COOH wherein R represents alkyl of from four to six carbon atoms via their alkali metal salts are described, which improvements comprise reacting a starting material selected from a. a methylketone of the formula R—COCH$_3$,
b. a mixture of said methyl ketone and the corresponding methyl alkyl carbinol of formula

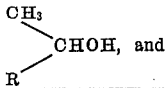

c. the non-acidic by-product obtained from the oxidation of castor oil to produce sebacic acid, R in (a) and (b) having the aforesaid meaning, with fused alkali metal hydroxide at a temperature between 250° and 375° C.

12 Claims, No Drawings

PRODUCTION OF CERTAIN CARBOXYLIC ACIDS

The present invention relates to improvements in the production of carboxylic acids by the oxidation of ketones, particularly by the alkali fusion of methyl ketones.

According to the present invention there is provided a process for the preparation of a carboxylic acid having the formula:

   R COOH   I by the oxidation of a methyl ketone having the formula:

   R COCH$_3$   II with fused alkali metal hydroxide at a temperature between 250° and 375° C., wherein R denotes a straight- or branched-chain alkyl radical containing from four to six carbon atoms per molecule.

The methyl ketone employed in the present invention may be, for instance, methyl n-butyl ketone, methyl iso-butyl ketone, methyl n-pentyl ketone and methyl n-hexyl ketone. The methyl ketone used may be the pure or substantially pure compound, or, if desired, it may be in the form of a mixture with other organic substances.

In a particular embodiment of the present invention the carboxylic acid of formula 1 may be prepared by the oxidation of a mixture of a methyl ketone and the corresponding methyl alkyl carbinol having the formula:

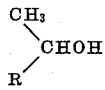
   III wherein R is as hereinbefore defined.

For instance, a mixture of methyl hexyl ketone and methyl hexyl carbinol may conveniently be used. Especially useful mixtures are the first group of non-acidic by-products obtained from the oxidation of castor oil to produce sebacic acid. The oxidation of castor oil by fusion with alkali metal hydroxide is a well-known industrial process for the manufacture of sebacic acid from which two distinct groups of non-acidic by-products distill off. The first is essentially a mixture of methyl hexyl ketone and methyl hexyl carbinol; and the second a mixture of alcohols containing principally from 14 to 16 carbon atoms per molecule. The first group of non-acidic by-products may, if desired, be used in the crude form which contains, in addition to the methyl hexyl ketone and methyl hexyl carbinol, small quantities of higher primary alcohols and olefinic materials. Alternatively, the first group of non-acidic by-products may be redistilled to obtain mixtures comprising essentially methyl hexyl ketone and methyl hexyl carbinol, the earlier fractions of which are richer in methyl hexyl ketone than the later fractions.

In accordance with a preferred embodiment of the present invention there is included in the reaction mixture a surface-active agent. Particularly preferred surface-active agents are the alkali metal salts of suitable phenols or sulphonic acids, especially those which will withstand the high temperatures of the reaction and also the action of molten caustic alkali. Such surface-active agents may be, for example, the sodium or potassium salts of capryl phenol, nonyl phenol, "Dobanic Acid" ("Dobanic Acid" is a trade mark and is a proprietary form of an alkyl-benzene sulphonic acid), phenol, hydroxyphenyl stearic acid, resorcinol, β-naphthol, o-cresol, diisopropyl phenol, triisopropyl phenol or mixtures thereof.

The proportion of surface-active agent may conveniently be in the range of from 0.1 to 20 percent by weight, and preferably in the range of from 1 to 10 percent by weight, based on the weight of the ketone, or where a mixture of organic materials is used, on the total weight of organic material for caustic fusion.

The proportion of alkali metal hydroxide used may be, for instance, in the range of from 1 to 3 molar proportions per molar proportion of starting material but proportions in the range of from 1.2 to 1.8 molar proportions per molar proportion of starting material are preferred.

The fused alkali metal hydroxide may be 100 percent potassium hydroxide or a mixture of potassium hydroxide and sodium hydroxide. The mixture may advantageously contain between 25 and 75 percent by weight of potassium hydroxide but a mixture containing between 40 and 50 percent by weight of potassium hydroxide is particularly preferred.

The reaction is advantageously carried out at a temperature in the range of from 280° to 350° C., and preferably in the range of from 300° to 350° C. The reaction may conveniently be carried out at atmospheric pressure but if desired superatmospheric pressure may be used.

Although the reaction may be carried out in the presence of small amounts of water, for example up to 5 percent, the use of substantially anhydrous conditions in the lower part of the temperature range is preferred.

In the process of the present invention the alkali metal salt of the carboxylic acid is produced, and after acidification the free acid may be obtained by any conventional method, for instance separation of the crude acid or extraction with a solvent followed by distillation.

The carboxylic acids produced by the process of the present invention are especially useful as organic intermediates, for example in the preparation of synthetic lubricants.

The following examples further illustrate the present invention. Parts by weight shown therein bear the same relation to parts by volume as do kilograms to liters. Parts and percentages are expressed by weight unless otherwise stated. The aqueous mixed alkali referred to in the examples contains 1.04 moles alkali per 100 grams mixture.

EXAMPLE 1

40 parts of potassium hydroxide pellets were placed in a mild steel vessel fitted with stirrer and thermometer pocket. The outlet led to an air condenser topped with a Dean and Stark apparatus. The temperature was raised to 340° C. and to the stirred alkali was added 50 parts of methyl isobutyl ketone regularly over a period of 230 minutes. Heating was completed after a further 30 minutes at the same temperature, and water was added gradually to dissolve the potassium salts and cool the mixture. 4.5 parts of the starting material were recovered from the Dean and Stark and 11,500 parts by volume of gas were evolved during the reaction.

The alkaline solution was filtered and the acidified with sulphuric acid. The organic material was extracted with chloroform and washed with water to remove sulphuric acid, dried and distilled. 34.8 parts of isopentanoic acid were collected at 67° to 70° C. and 14 millimeters of mercury pressure. The yield was 77.2 percent.

EXAMPLE 2

82.3 parts of potassium hydroxide and 63.1 parts of sodium hydroxide were placed in a mild steel vessel similar to that used in Example 1. The temperature was raised to 320° C., and to the stirred alkali was added 260 parts of the first group of by-products in the crude form, obtained in the manufacture of sebacic acid, dropwise over a period of 250 minutes.

36 parts by volume of organic distillate were then returned to the reactor in the same way as the original material over a further period of 20 minutes.

After a further half-hour at reaction temperature heating was discontinued and 1,000 parts by volume of water were added to the reaction mixture. 15 parts of organic distillate were produced at this point, the principal constituents being 2-methyloctenes with smaller quantities of octenes, hexane, methyl hexyl ketone and capryl alcohol, and 86,000 parts by volume of gas were evolved.

After filtering the alkaline solution, it was acidified with sulphuric acid, and the organic layer was washed with water.

The aqueous layer was extracted with chloroform and the extract was added to the organic material and distilled.

213.4 parts of 98.4 percent heptanoic acid boiling at 107° to 111° C. at 8 millimeters of mercury pressure were collected. A further 10.8 parts of boiling point 190° to 198° C. at 8 millimeters of mercury pressure contained 14.4 percent heptanoic acid, 51.4 percent myristic acid and 24.3 percent palmitic acid.

EXAMPLE 3

34 parts potassium hydroxide and 7 parts sodium hydroxide were placed in the apparatus described in Example 1 and the temperature raised to 300° C. 65 parts of methyl hexyl ketone of 96.1 percent purity were then added over a period of 2 to 3 hours while maintaining a steady temperature. After a further 30 minutes at reaction temperature heating was discontinued and 200 parts by volume of water were added to the reaction mixture. 14,000 parts by volume of gas were evolved, and 2.5 parts of organic distillate recovered.

After filtering the alkaline solution, it was acidified with sulphuric acid and the resultant mixture extracted with chloroform.

The separate chloroform extract was distilled to remove solvent and the residue distilled under vacuum. 54.7 parts of 97.4 percent heptanoic acid boiling at 114° to 116° C. at 15 millimeters of mercury pressure were obtained. The yield was 83 percent.

EXAMPLE 4

20 parts potassium hydroxide were placed in the apparatus described in Example 1 and the temperature raised to 340° C. 32.5 parts methyl hexyl ketone of 96.1 purity were then added over a period of 2 to 3 hours while maintaining a steady temperature. After a further 85 minutes at reaction temperature heating was discontinued and 200 parts by volume of water were added to the reaction mixture. 7,800 parts by volume of gas had been evolved, and 0.7 part of organic distillate had been recovered.

After filtering the alkaline solution it was acidified with sulphuric acid and the resultant mixture extracted with ethyl acetate.

The separate ethyl acetate extract was distilled to remove solvent and the residue distilled under vacuum. 30.0 parts of 97 percent heptanoic acid boiling at 116° C. at 15 millimeters of mercury pressure were obtained. The yield was 90.9 percent.

EXAMPLE 5

260 parts aqueous mixed alkali (58:42 sodium hydroxide/potassium hydroxide) and 5 parts capryl phenol were placed in a mild steel vessel similar to that used in Example 1, but with a distillation head fixed immediately to the outlet leading to a condenser.

The temperature was raised to 350° C. by which time 128 parts of water had been distilled. To the stirred mixture was added 343.5 parts of the first group of by-products obtained in the manufacture of sebacic acid after being redistilled and containing 30 percent methyl hexyl ketone and 0.42 percent water over a period of 5½ hours, during which time the temperature was dropped gradually to 312° C. 91,000 parts by volume of gas were evolved and 57.5 parts of distillate were recovered. Heating was discontinued and 1,000 parts by volume of water were added to the reaction mixture.

The aqueous alkaline solution was filtered, then acidified with sulphuric acid and allowed to stand. The heptanoic acid layer was distilled under vacuum. 270.4 parts of 98 percent heptanoic acid boiling at 107° to 111° C. at 8 millimeters of mercury pressure were obtained. A further 1.9 parts boiling at 190° to 198° C. at 8 millimeters of mercury pressure contained 66.7 percent heptanoic acid.

EXAMPLE 6

434 parts of aqueous mixed alkali (58:42 sodium hydroxide/potassium hydroxide) and 8 parts capryl phenol were placed in the apparatus described in Example 5.

The temperature was raised to 330° C. and to the stirred mixture was added 500 parts of the first group of by-products obtained in the manufacture of sebacic acid after being redistilled and containing 30 percent methyl hexyl ketone and 0.06 percent water over a period of 5½ hours.

During the first hour of addition the temperature was allowed to fall steadily to reach 305° C. and maintained at that temperature during the rest of the addition. At the end of the addition period 122 parts by volume of organic distillate were recovered and returned to the reaction vessel over a period of half an hour bringing the total addition time to 370 minutes.

133,000 parts by volume of gas were given off and 51.5 parts of distillate were recovered. Heating was discontinued and 1,500 parts by volume of water were added to the reaction mixture. The products were worked up as in Example 5 and 422.8 parts of 98.1 percent heptanoic acid boiling at 107° to 111° C. at 8 millimeters of mercury pressure were obtained. A further 12.6 parts boiling at 190° to 198° C. at 8 millimeters of mercury pressure contained 93% heptanoic acid.

EXAMPLE 7

300 parts aqueous mixed alkali (58:42 sodium hydroxide/potassium hydroxide) and 3.0 parts of "Dobanic Acid JN" were placed in the apparatus described in Example 5 and the procedure followed as in Example 5. 150 parts of water distilled initially.

To the stirred mixture was added 300 parts of the first group of by-products obtained in the manufacture of sebacic acid after being redistilled and containing 30 percent methyl hexyl ketone and 3.2 percent water over a period of 6 hours.

At the end of the addition period 76 parts by volume of organic distillate were recovered and returned to the reaction vessel over a further period of half an hour bringing the total addition time to 330 minutes.

94,500 parts by volume of gas were given off and 15.6 parts of distillate were recovered. Heating was discontinued and 1,000 parts by volume of water were added to the reaction mixture, the products being worked up as in Example 5.

267.4 parts of 98.3 percent heptanoic acid boiling at 107° to 111° C. at 8 millimeters of mercury pressure were obtained.

EXAMPLE 8

280 parts aqueous mixed alkali (58:42 sodium hydroxide/potassium hydroxide) and 5 parts n-nonyl phenol were placed in the apparatus described in Example 5.

The procedure was followed as described in Example 5, 143 parts of water being distilled initially.

To the stirred mixture was added 300 parts of the first group of by-products obtained in the manufacture of sebacic acid after being redistilled and containing 30 percent methyl hexyl ketone and 3.3 percent water over a period of 310 minutes.

At the end of the addition period 58 parts by volume of organic distillate were recovered and returned to the reaction vessel over a further period of 35 minutes bringing the total addition time to 345 minutes.

94,000 parts by volume of gas were given off and 15.0 parts of distillate were recovered. Heating was discontinued and 1,000 parts by volume of water were added to the reaction mixture, the product being worked up as in Example 5.

263.9 parts of 99.1% heptanoic acid boiling at 107° to 111° C. at 8 millimeters of mercury pressure were obtained. A further 8.3 parts boiling at 120° to 150° C. at 10 millimeters of mercury pressure contained 92.9 percent heptanoic acid.

EXAMPLE 9

450 parts aqueous mixed alkali (58:42 sodium hydroxide/potassium hydroxide) and 8.5 parts capryl phenol were placed in the apparatus described in Example 5. The procedure was followed as described in Example 5, 233 parts of water being distilled initially.

To the stirred mixture was added 522 parts of the first group of by-products obtained in the manufacture of sebacic acid after being redistilled and containing 30 percent methyl hexyl ketone and 0.61 percent water over a period of 4 hours.

At the end of the addition period 110 parts by volume of organic distillate were recovered and returned to the reaction vessel over a further period of 1 hour bringing the total addition time to 5 hours.

160,500 parts of gas were given off and 28.2 parts of distillate were recovered.

The products were worked up as in Example 5, giving a main fraction of 405.5 parts of 98.2 percent heptanoic acid and a second fraction of 32.7 parts of 96.3 percent heptanoic acid.

By carrying out the same procedure, but without the addition of capryl phenol, 400 parts of organic distillate were recovered at the end of the addition period thus demonstrating the advantage of the presence of a surface-active agent in the process.

EXAMPLE 10

432 parts aqueous mixed alkali and 8 parts resorcinol were placed in the apparatus described in Example 5. 227 parts of water were distilled out up to 342° C. under 20 millimeters of mercury pressure.

The temperature was dropped to 330° C. before the dropwise addition of 500 parts of the first group of by-products obtained in the manufacture of sebacic acid after being redistilled and comprising 36 percent methyl hexyl ketone in octan-2-ol containing 0.06 percent water began. The temperature was dropped gradually over the first 100 minutes of the addition time to 303° C. and retained there until the end of the total reaction time (390 minutes). The addition was complete after 330 minutes by which time 126 parts by volume of organic distillate had been collected. The latter was returned to the reactor dropwise during the last hour of reaction.

153,000 parts by volume of gas were given off and 37 parts of organic distillate were recovered. Heating was stopped and 1,500 parts of water were added giving an additional 4.5 parts of organic steam distillate.

The aqueous alkaline solution was filtered, then acidified with sulphuric acid and allowed to stand. The heptanoic acid layer was separated and distilled under vacuum. 448.2 parts of 99.1 percent heptanoic acid distilled at 118°–120° C. at 15 millimeters of mercury pressure. The yield was 89 percent.

EXAMPLE 11

430 parts of aqueous mixed alkali and 16 parts of $\beta$-naphthol were placed in the apparatus described in Example 5. 223 parts of water were distilled out as in Example 10.

500 parts of the first group of by-products obtained in the manufacture of sebacic acid after being redistilled and comprising 36 percent methyl hexyl ketone in octan-2-ol containing 0.05 percent water were added dropwise. The temperature dropped from 335° C. at the start to 304° C. in 70 minutes and was kept at 303° C. until the end of the total reaction time (375 minutes) when heating was concluded. This was returned to the reaction mixture during the remaining reaction time.

157,000 parts by volume of gas had been given off and 23.5 parts of organic distillate had been collected. A further 2.7 parts of organic distillate were collected during the addition of 1,500 parts of water to the hot reaction mixture.

The heptanoic acid was recovered as in Example 10 and 445.8 parts (89 percent yield) were distilled.

EXAMPLE 12

This was similar to Example 11 using 431 parts aqueous mixed alkali, 8 parts $\beta$-naphthol and 500 parts of the first group of by-products obtained in the manufacture of sebacic acid after being redistilled and comprising 36 percent methyl hexyl ketone in octan-2-ol, and containing 0.05 percent water.

222 parts of water were distilled off initially. The total reaction time was 370 minutes. The total final organic distillate was 36.8 parts and the volume of gas given off was 154,500 parts by volume. 457 parts of 99 percent heptanoic acid were distilled off. The yield was 91 percent.

EXAMPLE 13

The reaction and work-up were similar to Example 11 except that 8 parts o-cresol were used instead of the $\beta$-naphthol. 432 parts of aqueous mixed alkali were used from which 220 parts of water was distilled before adding 500 parts of the first group of by-products obtained in the manufacture of sebacic acid which have been redistilled and which comprises 36 percent methyl hexyl ketone in octan-2-ol containing 0.05 percent water. The initial temperature of reaction was 345° C. which was dropped to 302° C. in 60 minutes. The addition time was 320 minutes and the total reaction time was 360 minutes.

160,500 parts of gas were given off and the total final organic distillate was 34.3 parts. 451.8 parts of 99 percent heptanoic acid were distilled off. The yield was 90 percent.

EXAMPLE 14

The reaction and work-up were similar to Example 11 except that 16 parts capryl phenol were used instead of $\beta$-naphthol. 432 parts of aqueous mixed alkali were used from which 222 parts of water were distilled before adding 500 parts of the first group of by-products obtained in the manufacture of sebacic acid which have been redistilled and which comprise 44 percent methyl hexyl ketone in octan-2-ol containing 0.06 percent water. The initial temperature of reaction was 340° C. which was dropped to 305° C. in 80 minutes. The addition time was 330 minutes and the total reaction time was 370 minutes.

The total final organic distillate was 36.3 parts and 145,500 parts by volume of gas were given off. The main heptanoic acid fraction (99 percent heptanoic acid) was 427.8 parts and 36.4 parts of a second fraction containing 75% heptanoic acid were obtained.

EXAMPLE 15

The reaction and work-up were similar to Example 11 except that 8 parts 2,4,6-triisopropyl phenol were used instead of the $\beta$-naphthol. 451 parts of aqueous mixed alkali were used from which 235.5 parts of water were distilled out before adding 500 parts of the first group of by-products obtained in the manufacture of sebacic acid which have been redistilled and which comprise 39 percent methyl hexyl ketone in octan-2-ol containing 0.02 percent water. The initial temperature of reaction was 321° C, which was dropped to 305° C. in 50 minutes. The addition time was 335 minutes and the total reaction time was 380 minutes.

The total organic distillate weighed 43.4 parts and 145,000 parts by volume of gas were given off. The main heptanoic acid fraction was 433.7 parts (98 percent heptanoic acid), and 21.5 parts of a second fraction containing 94 percent heptanoic acid were obtained.

EXAMPLE 16

The reaction and work-up were similar to Example 11 except that 8 parts of capryl phenol were used instead of $\beta$-naphthol. 452 parts of aqueous mixed alkali were used from which 233 parts of water were distilled out before adding 540 parts of the first group of by-products obtained in the manufacture of sebacic acid which have been redistilled and which comprise 9.4 percent methyl hexyl ketone in octan-2-ol containing 0.24 percent water. The initial temperature of reaction was 330° C. which was dropped to 305° C. in an hour. The addition time was 360 minutes and the organic distillate (92.3 parts) was not returned to the reaction. The latter contained 15 percent parts methyl hexyl ketone and 52 percent parts octan-2-ol. 163,000 parts by volume of gas had been evolved.

The main heptanoic acid fraction was 438.6 parts and was essentially pure, and 3.4 parts of a second fraction were obtained containing 69 percent heptanoic acid.

EXAMPLE 17

430 parts of aqueous mixed alkali and 8 parts of capryl phenol were placed in the apparatus described in Example 5 and 225.5 parts of water were distilled out as in Example 10.

The apparatus was then switched to reflux conditions as in Example 1. The temperature was at 318° C. when the dropwise addition of 502 parts of the first group of by-products obtained in the manufacture of sebacic acid which have been distilled and which comprise 37 percent methyl hexyl ketone in octan-2-ol containing 0.05 percent water was begun. The temperature was lowered gradually over the first 50 minutes of the addition time to 303° C. and maintained there for a further 90 minutes before lowering it again to reach 293° C. after a total of 180 minutes. The temperature was raised again to 303° C. near the end of the addition time (335 minutes) and to 308° C. at the completion of the reaction time (380 minutes) by which time no more gas was being evolved. 144,500 parts by volume of gas had been given off, and 34 parts of organic distillate had collected in the Dean and Stark apparatus. A further 11.3 parts of organic steam distillate were collected on adding the 1,500 parts of water at the end of the reaction time.

The work-up of the product was as in Example 11. 448.4 parts of heptanoic acid were distilled off and consisted of 98 percent heptanoic acid.

EXAMPLE 18

This was similar to Example 11 except that 8.1 parts of commercial hydroxyphenyl stearic acid were used instead of β-naphthol. 431 parts of aqueous mixed alkali were used from which 224.3 parts of water were distilled out before adding 500 parts of the first group of by-products obtained in the manufacture of sebacic acid which have been redistilled and which comprise 36 percent methyl hexyl ketone in octan-2-ol containing 0.06 percent water.

The initial temperature of reaction was 320° C. which was lowered to 300° C. in 90 minutes. The addition time was 320 minutes and the total reaction time was 365 minutes.

The total final organic distillate weighed 44.8 parts and 155,500 parts by volume of gas were given off. The heptanoic acid fraction was 440.6 parts and consisted of 99 percent heptanoic acid.

EXAMPLE 19

The reaction and work-up were carried out as in Example 11 except that the apparatus was made of nickel and 180 parts phenol were used instead of the β-naphthol.

5,420 parts of aqueous alkali were used from which 2,780 parts of water were distilled before the dropwise addition of 6,000 parts of the first group of by-products obtained in the manufacture of sebacic acid which have been redistilled and which comprise 36 percent methyl hexyl ketone in octan-2-ol containing 0.06 percent water was begun. The initial temperature was 328° C. which was lowered to 306° C. gradually during 1 hour. The addition time was 410 minutes and the total reaction time was 480 minutes.

The organic distillate was 560 parts and 1,476,000 parts by volume of gas were evolved. The main fraction distilled was 4729 parts (98 percent heptanoic acid) and 240 parts of a higher boiling fraction containing 97 percent heptanoic acid were obtained.

EXAMPLE 20

The reaction and work-up was conducted as in Example 19 except that the phenolic additive consisted of 300 parts of a mixture of 2,6-diisopropyl phenol and 2,4,6-triisopropyl phenol.

2,860 parts of water were distilled from the alkali. The weight of materials used and the times and temperatures used were as in Example 19.

The organic distillate was 775 parts and 1,452,000 parts by volume of gas were evolved. The main fraction distilled was 4,810 parts (95 percent heptanoic acid) and 54.5 parts of a higher boiling fraction were obtained containing 88 percent heptanoic acid.

EXAMPLE 21

The reaction and work-up were as in Example 19 except that 192 parts of the same additive were used.

5,420 parts of alkali were used from which 2,840 parts of water were distilled before adding dropwise 6,000 parts of the first group of by-products obtained in the manufacture of sebacic acid which have been redistilled and which comprise 36 percent methyl hexyl ketone in octan-2-ol containing 0.06 percent water. The initial temperature was 328° C. which was gradually lowered to 307° C. during the first hour. The addition time was 420 minutes and the total reaction time was 480 minutes.

504 parts of organic distillate were recovered and 1,458,000 parts by volume of gas were evolved. The main fraction distilled was 4,992 parts (97 percent heptanoic acid) and 193 parts of a further fraction were obtained containing 95 percent heptanoic acid.

We claim:

1. A process for producing a carboxylic acid of the formula R—COOH wherein R is alkyl of from four to six carbon atoms, said process comprising reacting a starting material selected from
   a. a methylketone of the formula R—COCH$_3$,
   b. a mixture of said methyl ketone and the corresponding methyl alkyl carbinol of the formula

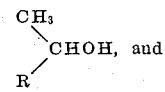

c. the non-acidic by-product obtained from the oxidation of castor oil to produce sebacic acid,
   R in (a) and (b) having the aforesaid meaning,
   with fused alkali metal hydroxide at a temperature between 250° and 375° C.

2. A process of claim 1, wherein said starting material is selected from methyl n-butyl ketone, methyl isobutyl ketone and, methyl n-pentyl ketone, methyl n-hexyl ketone.

3. A process as claimed in claim 1, wherein the proportion of alkali metal hydroxide used is in the range of from 1 to 3 moles per mole of the starting material.

4. A process as claimed in claim 1, wherein the proportion of alkali metal hydroxide used is in the range of from 1.2 to 1.8 moles per mole of starting material.

5. A process as claimed in claim 1, wherein the fused alkali metal hydroxide is 100 percent potassium hydroxide, or a mixture of potassium hydroxide and sodium hydroxide containing between about 25 and 75 percent by weight of potassium hydroxide.

6. A process as claimed in claim 1, wherein the reaction is carried out at a temperature in the range of from 300° to 350° C and in the presence of from 0 to 5 percent of water.

7. A process as claimed in claim 1, wherein a surface-active agent is added to the reaction mixture in a proportion within the range of from 0.1 to 20 percent by weight based on the weight of the ketone.

8. A process as claimed in claim 7, wherein the surface-active agent is the alkali metal salt of a phenol or sulphonic acid which withstands the high temperatures of the reaction and also the action of molten caustic alkali.

9. A process as claimed in claim 7, wherein the surface-active agent is the sodium or potassium salt of capryl phenol, nonyl phenol or dodecyl benzene sulfonic acid.

10. A process as described in claim 1, wherein said starting material is a mixture of methyl hexyl ketone and methyl hexyl carbinol; or the first group of non-acidic by-products, either in the crude form or redistilled, which by-products have been obtained in the manufacture of sebacic acid.

11. A process as claimed in claim 10, wherein a surface-active agent is added to the reaction mixture in a proportion of from about 1 to 10 percent by weight based on the total weight of organic material therein, and the reaction is carried out at a temperature in the range of from 280° to 350° C.

12. A process as claimed in claim 11, wherein said surface-active agent is the sodium or potassium salt of phenol, hydroxyphenyl-stearic acid, resorcinol, β-naphthol, o-cresol, di-isopropyl phenol, tri-isopropyl phenol or mixtures thereof.

* * * * *

UNITED STATES PATENT OFFICE
CERTIFICATE OF CORRECTION

Patent No. 3,671,581      Dated June 20, 1972

Inventor(s) John Francis Edmund Keenan

It is certified that error appears in the above-identified patent and that said Letters Patent are hereby corrected as shown below:

Page 1, the line following Application No.: 819,084, insert --- Foreign Application Priority Data---

April 29, 1968    Great Britain    20126

Signed and sealed this 10th day of April 1973

(SEAL)
Attest:

EDWARD M. FLETCHER, JR.
Attesting Officer

ROBERT GOTTSCHALK
Commissioner of Patents